United States Patent Office 2,759,355
Patented Aug. 21, 1956

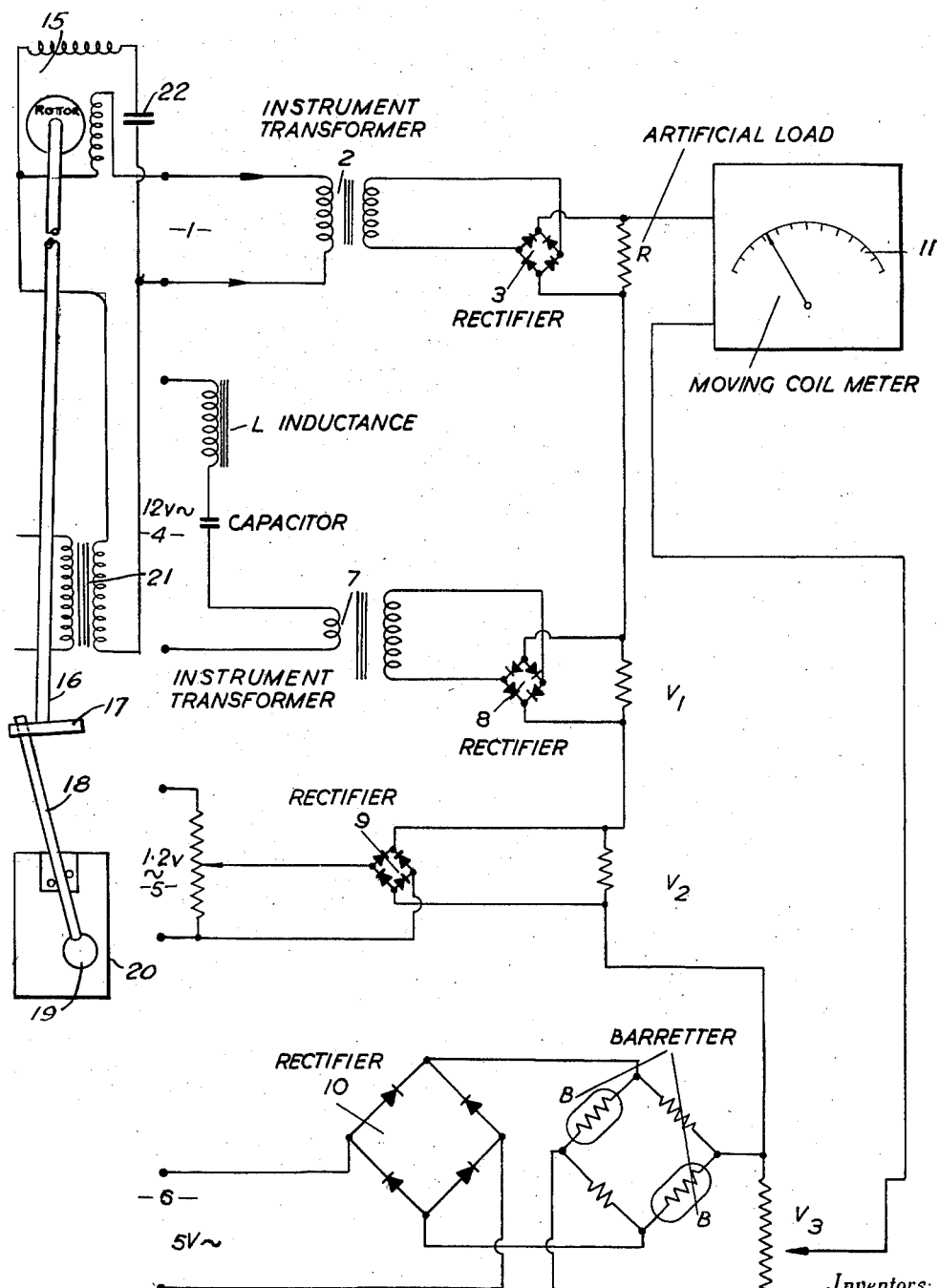

2,759,355

ELECTRICAL VISCOMETER

Archibald R. Boyle, Glasgow, and Thomas Byrne, Clydebank, Scotland, assignors to Dobbie McInnes Limited, Glasgow, Scotland, a British company Application November 21, 1951, Serial No. 257,492

Claims priority, application Great Britain November 27, 1950

4 Claims. (Cl. 73—59)

This invention relates to a method of and means for compensating electrical viscometers for errors due to variation in the frequency of the supply.

It is of particular importance when continuous control is in operation, possibly at peak load periods, that any signal errors do not cause a major disturbance of conditions. It has been accepted theretobefore that the method of correction is by means of an intermediate rotary converter to provide a stabilised frequency supply whatever be the variations in the mains. That method, however, is costly and the present invention relates to means for signal compensation which can be used in circumstances where the resulting error in measurement (or indication) is proportional to the variation in frequency in either the same or in opposite directions.

Normally variations in the supply frequency are accompanied by variations in voltage, but as separate means are normally used in electrical viscometers to compensate for variation in supply voltage as far as the final signal is concerned, for example by inherent design of the electric motor, the present invention is concerned with compensation for the frequency variations.

The invention is applicable to electrical viscometers in which viscosity is measured by measuring the input current (or a function thereof) to an electric motor driving vanes or paddles in the viscous liquid under test.

The measuring current whose value (or a function of which) indicates (or measures, records or controls) will be referred to hereinafter and in the claims as the final signal; in the case of a viscometer as aforesaid this is the input current to the motor. It is with compensation of the final signal that the present invention is concerned.

The derivation of the first voltage is effected through a resonant circuit supplied from the supply voltage to the viscometer and tuned to a frequency somewhat higher than the maximum likely variation in frequency in an upwards direction. A variation therefore of, for example ±2 cycles at 50 cycles per second is accommodated within one side of the resonance curve which can be approximated to a straight line. Voltage variations arising from such frequency variation are rectified and constitute the first voltage. Thus, by designing or adjusting the circuit magnification factor $$\left(Q = \frac{WL}{R}\right)$$

of the resonant circuit, the correct variation of the first voltage required to compensate for the frequency error that would otherwise arise in the final signal is obtained.

This first voltage, however, while thus correcting for frequency variations, itself includes an error due to variations in the supply voltage which is common to the viscometer motor and the resonant circuit. Accordingly a voltage is derived from such supply and rectified and fed to a non-reactive resistance load which thus provides a second voltage which corrects the first voltage for voltage variation in the supply voltage and is independent of frequency. That is to say, the non-reactive load (or resistance) is designed so as to give the required correction, namely so that:

$$\frac{dV2}{dV} = \frac{dV1}{dV}$$

where V is the supply voltage to the resonant circuit and the supply voltage to the correcting circuit (although these need not be of the same magnitude as each other but should always vary in proportion to each other); and V2 is the second voltage and V1 the first voltage. The polarities of the first and second voltages relative to each other and to the final signal are correlated in obvious manner to give the compensation. The second voltage is always in opposition to the first voltage.

However, it is necessary that the resultant voltage should influence the final signal in a positive or negative direction depending on which side of the standard frequency the variation has occurred. For this purpose a bias or third voltage is applied which is derived from the mains through a non-linear resistor, for example a barretter, and thus is independent of variations in frequency and supply and this barretter circuit is designed to make the voltage resulting from all three voltages together zero at the standard frequency, with or without a predetermined backing-off voltage.

The bias voltage may be obtained in alternative ways, for example, by using a D. C. battery with a rheostat.

Thus when frequency variation occurs above or below the standard a resultant positive or negative compensating voltage or correcting signal is applied to the final signal.

It would be possible alternatively to work on the other side of the peak of the resonance curve, that is, by turning the resonant circuit to a frequency somewhat lower than the minimum likely variation.

The invention is thus applicable to any viscometer in which the frequency error in the final signal is a constant or a definite function of strengths of signal.

One example of the invention is illustrated in the accompanying drawing, which is a circuit diagram of a viscometer and its automatic frequency compensating circuit in accordance with the present invention.

The main signal from the viscometer enters the circuit at 1 and passes through an instrument transformer 2 and a rectifier 3 to an artificial load R.

The viscometer comprises a two-phase induction motor 15 whose short-circuited or squirrel cage rotor is connected through shaft 16, crank disc 17, and gyratory shaft 18 to a spherical paddle or drag member 19 which is thus driven round in container 20 wherein is the viscous liquid under test. The mechanical parts of such an arrangement are shown in greater detail in concurrent U. S. A. patent application Serial No. 203,822.

The electrical supply from the mains is through a transformer 21, and the phase-splitting capacitor 22 allows a two phase supply to be obtained from a single phase source. The torque, and consequently the current for the motor, varies as a function of the viscosity of the liquid.

Three compensating circuits 4, 5 and 6 are provided, the supply being in each case in this example derived from the supply voltage through transformers, and in the present example the derived voltage feeding circuit 4 may be twelve volts, that feeding circuit 5, 1.2 volts, and that feeding circuit 6, 5 volts, alternating current in each case. Circuit 4 is a resonant circuit including an inductance L and a capacity C and feeds to a load indicated at V1 through an instrument transformer 7 and a rectifier 8. Circuit 4 is as aforesaid tuned to a frequency somewhat higher than the maximum likely variation in frequency.

Circuit 5 similarly feeds to a non-reactive load indicated at V2 through a rectifier 9, while circuit 6 includes a rectifier 10 and a bridge including two barretters B to a load indicated at V3.

A moving coil meter for indicating the compensated viscosity (the final signal) is indicated at 11 and is connected with the artificial load R and the three compensating loads V1, V2, and V3.

Thus, to summarize, we have the following relationships:

Circuit 4

$$\frac{dV1}{d(f)} = \frac{dV}{d(f)}$$

where $f$ is supply frequency

Circuit 5

$$\frac{dV2}{dV} = \frac{dV1}{dV}$$

where V is supply volts

Circuit 6

$$\frac{dV3}{dV} = 0$$

$$\frac{dV3}{d(f)} = 0$$

Moreover, apart from the question of a backing-off voltage, we have, at the standard frequency the relationship $V1 + V2 + V3 = 0$.

We claim:

1. An electrical viscometer comprising an electric motor, a drag member adapted to be driven by said motor through viscous liquid under test, means for deriving a final signal from the input current to said motor, and means to compensate the final signal, at any value thereof, for errors therein due to variation in the frequency of an alternating current voltage supply to the viscometer and comprising, in combination, a resonant circuit derived from said voltage supply and tuned to a frequency at least slightly outside the bandwidth within which frequency variations are likely to be confined, means rectifying the voltage output from the resonant circuit; a second circuit also derived from said voltage supply, said second circuit being non-reactive and including a non-reactive load, the second circuit output being thus independent of frequency variations, means rectifying the voltage output from the second circuit; means connecting the voltage outputs from the resonant and second circuits in opposition one to the other to give a resultant compensating voltage; means feeding said resultant compensating voltage to the final signal for compensation thereof when the frequency varies from its standard value, means for causing said resultant voltage to influence the final signal in a positive or negative direction depending on which side of the standard frequency the frequency variation has occurred, and means for measuring the frequency-compensated final signal.

2. An electrical viscometer comprising an electric motor, a drag member adapted to be driven by said motor through viscous liquid under test, means for deriving a final signal from the input current to said motor; and means to compensate the final signal, at any value thereof, for errors therein due to variation in the frequency of an alternating current voltage supply to the viscometer and comprising, in combination, a resonant circuit derived from said voltage supply and tuned to a frequency at least slightly outside the bandwidth within which frequency variations are likely to be confined, means rectifying the voltage output from the resonant circuit; a second circuit also derived from said voltage supply, said second circuit being non-reactive and including a non-reactive load, the second circuit output being thus independent of frequency variations, means rectifying the voltage output from the second circuit; means connecting the voltage outputs from the resonant and second circuits in opposition one to the other to give a resultant compensating voltage; a third circuit adapted to supply a direct current bias volage which is independent of frequency and supply voltage variations and which is adapted, when applied to the resultant voltage of the resonant and second circuit output voltages, substantially to balance same to give zero net compensating voltage at the standard frequency; means feeding said compensating voltage to the final signal for compensation thereof when the frequency varies from its standard value, and means for measuring the frequency-compensated final signal.

3. An electrical viscometer according to claim 2, in which said direct current bias voltage is adapted to give zero net compensating voltage substantially equal in value to a pre-determined backing-off voltage at the standard frequency.

4. An electrical viscometer comprising an electric motor, a drag member adapted to be driven by said motor through viscous liquid under test, means for deriving a final signal from the input current to said motor; and means to compensate the final signal, at any value thereof, for errors therein due to variation in the frequency of an alternating current voltage supply to the viscometer and comprising, in combination, a resonant circuit derived from said voltage supply and tuned to a frequency at least slightly outside the bandwidth within which frequency variations are likely to be confined, means deriving from the resonant circuit an output voltage which varies linearly with the current flowing therein, means rectifying the voltage output from the resonant circuit; a second circuit also derived from said voltage supply, said second circuit being non-reactive and including a non-reactive load, the second circuit output being thus independent of frequency variations, means rectifying the voltage output from the second circuit; means connecting voltage outputs from the resonant and second circuits in opposition one to the other to give a resultant compensating voltage; a third circuit also derived from said voltage supply, a non-linear resistance in said third circuit, adapted to supply a bias voltage which is independent of frequency and supply voltage variations, means rectifying said bias voltage, means applying the rectified bias voltage to the resultant voltage of the resonant and second circuit output voltages, to balance same to give zero net compensating voltage at the standard frequency; means feeding the net compensating voltage to the final signal for compensation thereof when the frequency varies from its standard value, and means for measuring the frequency-compensated final signal.

References Cited in the file of this patent

UNITED STATES PATENTS

| | | |
|---|---|---|
| 2,237,743 | McIntyre | Apr. 8, 1941 |
| 2,482,522 | Tubbs | Sept. 20, 1949 |
| 2,673,463 | Kimball | Mar. 30, 1954 |

FOREIGN PATENTS

| | | |
|---|---|---|
| 612,442 | Great Britain | Nov. 12, 1948 |